(12) United States Patent
Obara

(10) Patent No.: US 6,380,381 B1
(45) Date of Patent: Apr. 30, 2002

(54) LOW-SUBSTITUTED HYDROXYPROPYL CELLULOSE

(75) Inventor: Sakae Obara, Niigata-ken (JP)

(73) Assignee: Shin-Etsu Chemical Co., Ltd. (JP)

( * ) Notice: Subject to any disclaimer, the term of this patent is extended or adjusted under 35 U.S.C. 154(b) by 0 days.

(21) Appl. No.: 09/573,369

(22) Filed: May 17, 2000

(30) Foreign Application Priority Data

May 18, 1999 (JP) ............................................. 11-136787

(51) Int. Cl.[7] .......................... C08B 11/00; C08B 5/04; C08B 5/10; C08B 11/193; C08B 11/08

(52) U.S. Cl. ..................... 536/84; 536/30; 536/43; 536/41; 536/91; 536/95; 536/96

(58) Field of Search ............................. 536/30, 43, 41, 536/84, 91, 95, 96

(56) References Cited

U.S. PATENT DOCUMENTS 4,091,205 A  5/1978  Onda et al. ................... 536/85
5,200,194 A  4/1993  Edgren et al. ............... 424/473

FOREIGN PATENT DOCUMENTS

| JP | 07324101 | 12/1995 | ........... C08B/11/08 |
| JP | 10279601 | 10/1998 | ........... C08B/11/08 |
| WO | WO 97/03654 | 2/1997 | ........... A61K/9/14 |

OTHER PUBLICATIONS

European Search Report for Application No. 00304109.2–2115 dated Sep. 21, 2000.
U.S. application No. 09/309,532, Obara et al., filed May 11, 1999: 1–16, "Low–substituted Hydroxypropyl Cellulose and Process for Producing Same".

*Primary Examiner*—Jezia Riley
(74) *Attorney, Agent, or Firm*—Myers Bigel Sibley & Sajovec

(57) ABSTRACT

The present invention provides low-substituted hydroxypropyl cellulose exhibiting good granulation characteristics and tablet properties. Specifically, there is provided low-substituted hydroxypropyl cellulose having a hydroxypropoxyl content in the range of 5.0 to 16.0% by weight and an apparent average degree of polymerization in the range of 350 to 700.

8 Claims, No Drawings

LOW-SUBSTITUTED HYDROXYPROPYL CELLULOSE

BACKGROUND OF THE INVENTION

1. Field of the Invention

This invention relates to low-substituted hydroxypropyl cellulose having good granulation characteristics and tablet properties.

2. Description of the Related Art

Hydroxypropyl cellulose is a nonionic polymer derived from cellulose by etherifying hydroxyl groups of its constitutional glucose ($C_6H_{10}O_5$) units with hydroxypropyl groups, and is being used in a wide field of application owing to its diverse characteristics.

Generally, hydroxypropyl cellulose is a compound having a hydroxypropoxyl content of 50 to 80% by weight. A compound having a hydroxypropoxyl content of 5.0 to 16.0% by weight is called "low-substituted hydroxypropyl cellulose", and its properties are different from those of ordinary hydroxypropyl cellulose.

One difference between them lies in solubility in water. Specifically, hydroxypropyl cellulose is soluble in water, whereas low-substituted hydroxypropyl cellulose is insoluble in water but swells by absorption of water. By taking advantage of this property, low-substituted hydroxypropyl cellulose is used chiefly as a disintegrator for oral solid pharmaceutical preparations.

Moreover, since low-substituted hydroxypropyl cellulose is in fibrous form and hence serves to increase the hardness of tablets, it can be used as a dry binder. Furthermore, since its kneaded mixture with water has binding properties, it can also be used as a wet binder.

SUMMARY OF THE INVENTION

Generally, wet granulation is employed to improve the fluidity of a raw powder material having poor fluidity. However, the properties (i.e., particle size distribution and strength) of the resulting granular product, as well as the hardness and disintegrability of tablets formed therefrom, are primarily affected by the properties of the binder.

In the case of low-substituted hydroxypropyl cellulose, its degree of substitution and particle size have been considered to be important factors affecting its binding properties. However, it has frequently been recognized that, even if these factors are controlled, the disintegration of tablets may be delayed as a result of abnormally advanced granulation, or the hardness of tablets may be reduced as a result of unsatisfactory granulation characteristics.

In order to overcome these disadvantages of the prior art, the present inventors made intensive investigations and have now found that the degree of polymerization or molecular weight of low-substituted hydroxypropyl cellulose affects its binding properties in wet granulation. The present invention has been completed on the basis of this finding.

That is, the present invention provides low-substituted hydroxypropyl cellulose having a hydroxypropoxyl content in the range of 5.0 to 16.0% by weight and an apparent average degree of polymerization in the range of 350 to 700.

Good granulation characteristics and tablet properties can be obtained by using the low-substituted hydroxypropyl cellulose of the present invention.

DETAILED DESCRIPTION OF PREFERRED EMBODIMENTS

The present invention is more specifically described hereinbelow.

The low-substituted hydroxypropyl cellulose of the present invention has a hydroxypropoxyl content in the range of 5.0 to 16.0% by weight.

Its hydroxypropoxyl content can be determined according to the method of quantitative determination described in the Japanese Pharmacopoeia under the head of "Low-substituted Hydroxypropyl Cellulose".

Now, the apparent average degree of polymerization of the low-substituted hydroxypropyl cellulose of the present invention is explained below.

It is generally known that the degree of polymerization (or molecular weight) of a binder affects its binding power. This is believed to be due to the fact that a common binder exhibits a binding effect by dissolving in a solvent such as water, and the viscosity of the resulting solution depends on the degree of polymerization. However, since low-substituted hydroxypropyl cellulose does not dissolve in the solvent even in the case of wet granulation, its degree of polymerization has not been considered to be directly related to its granulation characteristics. Accordingly, no investigation has yet been made as to the relationship between the degree of polymerization (or molecular weight) and the granulation characteristics of low-substituted hydroxypropyl cellulose.

Now, the present inventors have surprisingly found that low-substituted hydroxypropyl cellulose having a specific degree of polymerization offers stable granulation characteristics, even though it does not dissolve in solvents. The reason for this is believed to be that low-substituted hydroxypropyl cellulose exhibits its binding properties by a mechanism different from that of common binders.

In the present invention, the apparent average degree of polymerization of low-substituted hydroxypropyl cellulose is defined to be a value calculated as the average degree of polymerization when it is determined according to a method similar to the method for determining the average degree of polymerization of cellulose (pulp) constituting the raw material for low-substituted hydroxypropyl cellulose as described in the official compendium (ASTM D1795-62).

This method comprises obtaining a relative viscosity from the kinematic viscosity of a solution of a sample in a cupri-ethylenediamine reagent solution and the kinematic viscosity of the solvent, calculating an intrinsic viscosity therefrom, and multiplying it by a factor to determine the average degree of polymerization. Since the factor used in this method is the factor defined for cellulose, it is necessary to define another factor for low-substituted hydroxypropyl cellulose. However, low-substituted hydroxypropyl cellulose is a compound into which only a slight quantity of substituent groups are introduced. Accordingly, on the assumption that there will be no significant difference as compared with cellulose, the apparent average degree of polymerization is determined by using the factor for cellulose directly.

The low-substituted hydroxypropyl cellulose of the present invention has an apparent average degree of polymerization in the range of 350 to 700 and preferably 400 to 600. The apparent average degree of polymerization can be controlled suitably by degree of polymerization for the starting material, reaction temperature, reaction time, and other process parameters in the process for preparing the low-substituted hydroxypropyl cellulose. If the apparent average degree of polymerization is less than 350, granulation by stirring may be advanced to an abnormal extent, resulting in an increased strength of the granular product and hence a prolonged disintegration time of the tablets formed therefrom. On the other hand, if the apparent average degree of polymerization is greater than 700, granulation may not proceed satisfactorily, resulting in an insufficient strength of the granular product and hence an insufficient hardness of the tablets formed therefrom.

In addition to the above-described properties, the low-substituted hydroxypropyl cellulose of the present invention preferably has a volume-average particle size (diameter) of 10 to 100 μm in use of a dry type laser diffraction method. If the average particle size is less than this range, the low-substituted hydroxypropyl cellulose has been pulverized so vigorously that it may be difficult to maintain the apparent average degree of polymerization in the range of 350 to 700 and, therefore, its binding properties may be abnormally enhanced in wet granulation. On the other hand, if the average particle size is greater than this range, the low-substituted hydroxypropyl cellulose may be unsuitable for wet granulation. Incidentally, the dry type laser diffraction method means the method wherein the volume-average particle size is measured based on the diffraction intensity when the laser is applied to the powders which has been jetted by a compressed air. A laser diffraction type particle size analyzer manufactured by Rodos & Helos, Inc. is exemplified. According to, for example, page 88 of "Kaitei Zoho Funtai Bussei Zusetsu (revised and enlarged edition of Illustration of Powder Properties" edited by Funtai Kogakukai and Nippon Funtai Kogyogijutsu Koyokai, published by Nikkei Gijutsu Tosho Co., Ltd., 1985, the volume-average particle size is calculated by $\{\Sigma(nD^3)/\Sigma n\}^{1/3}$ wherein D is a particle diameter, n is the number of particles having the particle diameter, and En is a total number of particles.

Moreover, the bulk density (densified) is preferably in the range of 0.4 to 0.8 g/ml. If the bulk density (densified) is less than 0.4 g/ml, the low-substituted hydroxypropyl cellulose may have poor fluidity and be hence unsuitable for practical purposes. On the other hand, if the bulk density (densified) is greater than 0.8 g/ml, the low-substituted hydroxypropyl cellulose may fail to achieve a sufficient hardness during compaction.

The bulk density can be measured in the following manner. A sample is uniformly fed, from 23 cm above, into a cylindrical vessel having a diameter of 5.03 cm and a height of 5.03 cm (hence a volume of 100 ml) through a JIS (Japanese Industrial standard) 22-mesh (710 μm) screen. After its upper surface is leveled, the vessel is fitted with a special-purpose cap supplied together with the powder tester by Hosokawa Micron Corporation, and the powder is added up to its upper edge. Then, the vessel is tapped 180 times from a tapping height of 1.8 cm. Thereafter, the cap is removed and the powder is leveled at the upper edge of the vessel and weighed. The measured value obtained in this state is regarded as the bulk density. This procedure can be carried out by use of the powder tester (PT-D) manufactured by Hosokawa Micron Corporation.

No particular limitation is placed on the method for granulating the low-substituted hydroxypropyl cellulose of the present invention, and any well-known method may be employed.

Similarly, No particular limitation is placed on the method for forming the low-substituted hydroxypropyl cellulose of the present invention into tablets, and any well-known method may be employed.

In addition to the low-substituted hydroxypropyl cellulose of the present invention, the tablets may contain, for example, active ingredients, lubricants (e.g., magnesium stearate), excipients (e.g., corn starch and lactose), and other disintegrators and binders. Although no particular limitation is placed on the content of the low-substituted hydroxypropyl cellulose of the present invention in the tablets, it is preferably in the range of 5 to 50% by weight.

The present invention is more specifically explained with reference to the following examples and comparative examples. However, these examples are not to be construed to limit the scope of the invention.

EXAMPLE 1

Wood pulp was soaked in a 49 wt % aqueous solution of sodium hydroxide and then pressed to obtain alkali cellulose. Eight hundred grams (800 g) of this alkali cellulose was charged into a reactor, and its atmosphere was replaced with nitrogen. After the addition of 85.6 g of propylene oxide, the resulting mixture was reacted, with stirring, at 40° C. for 1 hour and then at 70° C. for 1 hour. The reaction mixture was poured into a 5 liter double-arm kneader containing 2 liters of hot water at 65° C., kneaded therewith for about 10 minutes, and neutralized with acetic acid to crystallize the reaction product. This reaction product was washed with hot water at 90° C., dehydrated by pressing, dried, and then pulverized with a high-speed rotary impact pulverizer to obtain a low-substituted hydroxypropyl cellulose having a hydroxypropoxyl content of 11.0% by weight and an apparent average degree of polymerization of 530.

EXAMPLES 2–5 AND COMPARATIVE EXAMPLES 1–3

Low-substituted hydroxypropyl celluloses were prepared in the same manner as in Example 1, except that the hydroxypropoxyl content and the apparent average degree of polymerization were varied. The results thus obtained are shown in Table 1.

With respect to the low-substituted hydroxypropyl celluloses obtained in the foregoing examples and comparative examples, measurements were made under the following conditions.

1) Granulation By Stirring

70% by weight of lactose and 30% by weight of a low-substituted hydroxypropyl cellulose were mixed, and 200 g of the mixture was placed in a stirring granulation apparatus (Vertical Granulator VG-25, manufactured by Powrex Corporation) and subjected to stirring granulation by using hydroxypropyl cellulose (140 g of a 1 wt % aqueous solution of HPC-L, manufactured by Nippon Soda Co., Ltd.) as the binder. The granular product was dried by allowing it to stand at 60° C. overnight. The particle size distribution of the granular product was analyzed by sieving and used to determine the average particle size.

2) Tableting Test

The granular product was blended with 0.5% by weight of magnesium stearate, and this blend was formed (under a tableting pressure of 1 metric ton) into tablets (8 mm in diameter) by means of a rotary tablet machine. The hardness of the tablets was measured with an Erweka hardness tester, and the disintegration time thereof was measured according to the method described in the Japanese Pharmacopoeia. The results thus obtained are shown in Table 1.

TABLE 1

| | Low-substituted hydroxypropyl cellulose | | | | Granulation | | Tablets | |
|---|---|---|---|---|---|---|---|---|
| | Hydroxypropoxyl content (wt %) (Note 1) | Apparent average degree of polymerization (Note 2) | Average particle size (μm) (Note 3) | Bulk density (densified) (g/ml) | Observation on granulation | Average particle size of granular product (μm) | Hardness of tablets (kgf) | Disintegration time of tablets (min.) |
| Example 1 | 11.0 | 530 | 37 | 0.55 | Good | 150 | 5.2 | 5 |
| Example 2 | 11.1 | 353 | 38 | 0.54 | Good | 180 | 5.5 | 5 |
| Example 3 | 11.1 | 697 | 37 | 0.52 | Good | 120 | 4.8 | 4 |
| Example 4 | 5.1 | 528 | 38 | 0.51 | Good | 120 | 4.8 | 4 |
| Example 5 | 13.9 | 522 | 39 | 0.56 | Good | 190 | 6.0 | 5 |
| Comparative Example 1 | 11.1 | 310 | 37 | 0.53 | Excessive granulation | 750 | 9.8 | 20 |
| Comparative Example 2 | 11.0 | 810 | 38 | 0.51 | Insufficient granulation | 80 | 1.5 | 1 |
| Comparative Example 3 | 11.0 | 730 | 38 | 0.52 | Insufficient granulation | 85 | 1.9 | 1 |

(Note 1) "Hydroxypropoxyl content" was determined according to the Japanese Pharmacopoeia.
(Note 2) "Apparent average degree of polymerization" was determined according to ASTM D1795-62.
(Note 3) "Average particle size of granular product" was measured with a laser diffraction type particle size analyzer manufactured by Rodos & Helos, Inc.

As can be seen from Table 1, low-substituted hydroxypropyl cellulose having an apparent average degree of polymerization adjusted to a value of 350 to 700 offers good granulation characteristics and tablet properties.

What is claimed is:

1. Low-substituted hydroxypropyl cellulose having a hydroxypropoxyl content in the range of 5.0 to 16.0% by weight and an apparent average degree of polymerization in the range of 350 to 700.

2. Low-substituted hydroxypropyl cellulose according to claim 1 having said apparent average degree of polymerization in the range of 400 to 600.

3. Low-substituted hydroxypropyl cellulose according to claim 1, further having a volume-average particle size of 10 to 100 μm, wherein the volume average particle size is determined by subjecting said low-substituted hydroxypropyl cellulose to a dry tape laser diffraction method.

4. Low-substituted hydroxypropyl cellulose according to claim 2, further having a volume-average particle size of 10 to 100 μm, wherein the volume average particle size is determined by subjecting said low-substituted hydroxypropyl cellulose to a dry tape laser diffraction method.

5. Low-substituted hydroxypropyl cellulose according to claim 1, further having a densified bulk density in the range of 0.4 to 0.8 g/ml.

6. Low-substituted hydroxypropyl cellulose according to claim 2, further having a densified bulk density in the range of 0.4 to 0.8 g/ml.

7. Low-substituted hydroxypropyl cellulose according to claim 3, said low-substituted hydroxypropyl cellulose having a densified bulk density in the range of 0.4 to 0.8 g/ml.

8. Low-substituted hydroxypropyl cellulose according to claim 4, said low-substituted hydroxypropyl cellulose having a densified bulk density in the range of 0.4 to 0.8 g/ml.

* * * * *